(12) United States Patent
Husson et al.

(10) Patent No.: US 8,801,012 B2
(45) Date of Patent: Aug. 12, 2014

(54) VEHICLE AXLE MOUNTING ARRANGEMENT

(75) Inventors: Geoffroy Husson, Beauvais (FR); Frederic Ducroquet, Orville (FR)

(73) Assignee: AGCO SA, Beauvais (FR)

( * ) Notice: Subject to any disclaimer, the term of this patent is extended or adjusted under 35 U.S.C. 154(b) by 0 days.

(21) Appl. No.: 13/510,035

(22) PCT Filed: Nov. 12, 2010

(86) PCT No.: PCT/EP2010/067408
§ 371 (c)(1),
(2), (4) Date: Jul. 30, 2012

(87) PCT Pub. No.: WO2011/058147
PCT Pub. Date: May 19, 2011

(65) Prior Publication Data
US 2012/0285754 A1    Nov. 15, 2012

(30) Foreign Application Priority Data
Nov. 16, 2009 (GB) .................................. 0919977.9

(51) Int. Cl.
*B60G 1/04* (2006.01)
(52) U.S. Cl.
USPC ............ 280/124.11; 280/93.504; 280/93.508; 280/137.5
(58) Field of Classification Search
CPC ......... B60G 13/00; B60G 15/00; B60G 17/00
USPC ............... 280/93.504, 93.508, 137.5, 124.11, 280/124.128
See application file for complete search history.

(56) References Cited

U.S. PATENT DOCUMENTS

| 4,053,171 A | 10/1977 | Hyler |
| 4,229,021 A | 10/1980 | Schmid |

(Continued)

FOREIGN PATENT DOCUMENTS

| DE | 4129715 A1 | 3/1993 |
| EP | 0512550 A2 | 11/1992 |

(Continued)

OTHER PUBLICATIONS

International Search Report for International Application No. PCT/EP2010/067408 Dated Jan. 27, 2011.

(Continued)

*Primary Examiner* — Toan To (57) ABSTRACT

A vehicle has a chassis (11) and at least one axle (12, 13) suspended from the chassis for vertical and roll movement relative to the chassis. The axle is mounted on the chassis via a first pivotal mounting means in the form of an upper pair of arms (12a, 13a) which is pivoted on the chassis for vertical pivoting movement relative thereto and which carry an axle support (15, 16) on which the axle (12, 13) is free to pivot in the roll mode. A first damping means (19) acts between the chassis (11) and the first pivotal mounting means (12a, 13a) to control vertical movement of the axle relative to the chassis, and a second damping means acts between the first pivotal mounting means (12a, 13a) and the axle (12, 13) to provide independent control of the roll movement of the axle relative to the chassis. A second lower pair of pivoting arms (12b, 13b) also connect the axle (12, 13) to the chassis to control fore and aft movement of the axle relative to the chassis. When both axles are mounted on the chassis using the above upper (12a, 13a) and lower (12b, 13b) pairs of arms the line of action of the forces (F1-F4) applied to the chassis (11) by the upper arms (12a, 13a) at one end of the chassis may be substantially aligned with the line of action of the forces applied to the chassis by the lower arms (12b, 13b) at the other end of the chassis to reduce and tendency for the chassis to be twisted by these forces.

19 Claims, 9 Drawing Sheets

(56) References Cited

U.S. PATENT DOCUMENTS

| | | | |
|---|---|---|---|
| 4,235,300 A | | 11/1980 | Capjon |
| 4,418,932 A | | 12/1983 | Claar |
| 4,426,101 A | | 1/1984 | Dyer |
| 5,046,577 A | * | 9/1991 | Hurlburt ..................... 180/266 |
| 5,340,138 A | * | 8/1994 | Hurlburt ................. 280/93.504 |
| 5,476,276 A | * | 12/1995 | Hurlburt .................... 280/137.5 |
| 7,467,683 B2 | * | 12/2008 | Malvestio ..................... 180/266 |
| 7,540,517 B2 | * | 6/2009 | Wernli ........................... 280/278 |
| 2002/0109325 A1 | | 8/2002 | Purick |
| 2003/0042057 A1 | | 3/2003 | Kawazu |
| 2008/0231012 A1 | | 9/2008 | Rach et al. |

FOREIGN PATENT DOCUMENTS

| | | |
|---|---|---|
| EP | 0754576 A1 | 1/1997 |
| EP | 1123894 A2 | 8/2001 |
| EP | 1226985 A1 | 7/2002 |
| EP | 1518720 A1 | 9/2003 |
| EP | 1985474 A2 | 4/2008 |
| FR | 2570029 A1 | 3/1986 |
| JP | 11165516 A | 6/1999 |

OTHER PUBLICATIONS

UK Search Report for UK Application No. 0919977.9 Dated Jul. 8, 2010.

* cited by examiner

VEHICLE AXLE MOUNTING ARRANGEMENT

BACKGROUND OF THE INVENTION

1. Field of the Invention

This invention relates to vehicle axle mounting arrangement and in particular to such an arrangement which is suitable for use in an agricultural tractor or similar vehicle.

2. Description of Related Art

It is known, for example, to mount the front axle of a tractor onto a chassis of the tractor so that the axle can move both vertically and in a roll mode relative to the chassis and to provide a damping means which acts between the axle and the chassis to damp these movements.

Such axle mounting arrangements can be complex and bulky and can prove difficult to time for efficient damping of both vertical and roll movement of the axle.

BRIEF SUMMARY OF THE INVENTION

It is an object of the present invention to provide a vehicle with an improved form of axle mounting arrangement which at least mitigates the above difficulties.

Thus according to the present invention there is provided a vehicle having a chassis and at least one axle suspended from the chassis for vertical and roll movement relative to the chassis, the axle being mounted on the chassis via a first pivotal mounting means which is pivoted on the chassis for vertical pivoting movement relative thereto and which carries an axle support on which the axle is free to pivot in the roll mode, a first damping means acting between the chassis and the first pivotal mounting means to control vertical movement of the axle relative to the chassis, and a second damping means acting between the first pivotal mounting means and the axle to provide independent control of the roll movement of the axle relative to the chassis.

Such an axle mounting arrangement enables the damping to tuned for both vertical and roll modes independently thus allowing more accurate and complete damping control of the movements of the axle.

The first pivotal mounting means may comprise an upper pair of arms pivoted at their inner ends on the chassis and carrying the axle support at their outer ends A second lower pair of arms may be provided which are pivoted at their inner ends on the chassis for vertical pivoting movement relative thereto and act at their outer ends on the axle to control fore and aft movement of the axle relative to the chassis.

The vehicle may have front and rear axles which are respectively mounted on the front and rear of the chassis by respective upper and lower pairs of arms.

The two pairs of arms may be mounted on the chassis so that the line of action of the forces applied to the chassis by the upper arms at one end of the chassis is substantially aligned with the line of action of the forces applied to the chassis by the lower arms at the other end of the chassis, so that there is less tendency for the chassis to be twisted by the forces applied thereto by the axles.

In such an arrangement the upper pair of arms may have a first pair of downwardly extending brackets to which one end of the first damping means is secured and a second pair of upwardly extending brackets from which one end of the second damping means is secured.

The damping means may comprise hydraulic or pneumatic cylinders or spring units. These hydraulic or pneumatic cylinders or spring units may be connected with a fluid pressure control system which provides on the go active damping of the or each axle.

The chassis may have a central region end raised front and rear and regions beneath which the respective axles are mounted, the first damping means acting between a given upper pair of axle mounting arms and the adjacent raised end portion of the chassis.

Such a chassis configuration is particularly suitable for use with electric propulsion when each axle is provided with an electric drive motor located beneath the respective raised end portion of the chassis, a power source for each motor being housed in the central region of the chassis.

In such an arrangement the power source may comprise a fuel cell and/or batteries or an electrical generator driven by an internal combustion engine charging batteries.

In all the above vehicle configurations one or both axles may be steerable.

Also at least one axle may have a central vertically extending housing on which an upper implement attachment link mounted point is provided, lower implement attachment link mounting points being provided on either side of the centre of the axle. This central vertically extending housing may support a PTO drive shaft and may contain a drive train for the PTO shaft.

BRIEF DESCRIPTION OF THE DRAWINGS

The various aspects of the present invention will now be described with reference to the accompanying drawings in which.

DETAILED DESCRIPTION OF THE INVENTION

Referring to the drawings, a vehicle in the form of an agricultural tractor 10 has a chassis 11 on which a front axle 12 and rear axle 13 are pivotally mounted by upper pairs of arms 12a and 13a and lower pairs of arms 12b and 13b. The front upper and lower arms 12a and 12b at the front of the tractor are essentially identical to the rear upper and lower arms 13a and 13b at the rear of the tractor.

Figure 1:
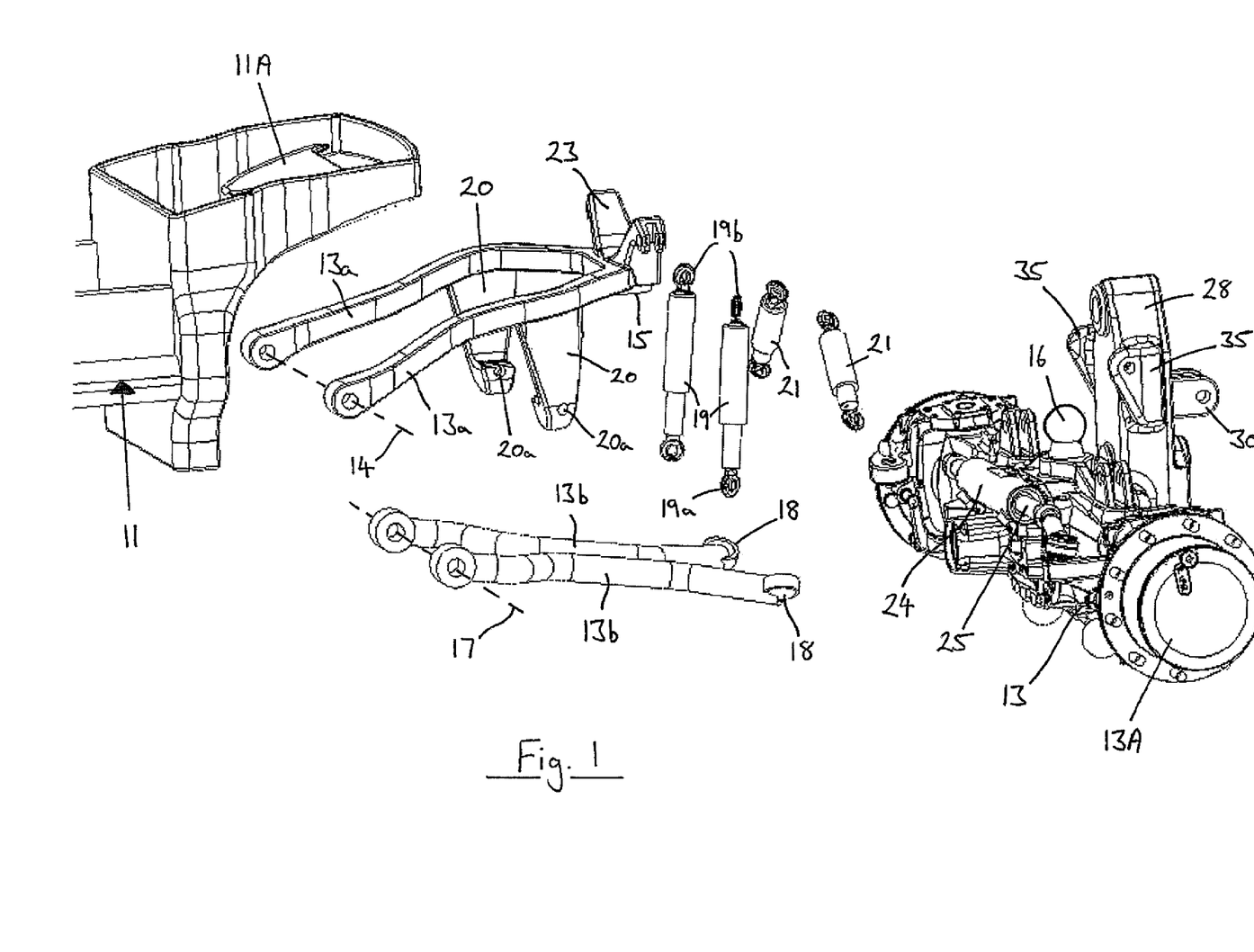
FIG. 1 shows a perspective exploded view of one end of a vehicle with an axle mounting arrangement in accordance with the present invention.

As can be seen from FIG. 1, the rear upper arms 13a are mounted on the chassis 11 for pivoting about and axis 14. The arms are joined at their outer ends to form a single generally U-shaped unit. Adjacent the outer ends of the arms 13a is provided a ball joint socket 15 which receives a ball joint 16 mounted on the axle 13.

The lower pair of arms 13b are mounted for pivoting relative to the axle 11 about and axis 17 and their outer ends have ball joint connectors 18 which connect the lower arms 13b with the axle 13.

Vertical pivoting movement of the upper arms 13a relative to rear raised portion 11A of the chassis 11 is controlled by a pair of hydraulic dampers 19 which are connected at their lower ends 19a to lower portions 20a of a pair of downwardly extending brackets 20 mounted on arms 13a. The upper ends 19b of dampers 19 are connected with raised chassis portion 11A. Thus the dampers 18, which may be simple dampers with predetermined damping characteristics or may be connected with a hydraulic suspension control system, are designed to control the vertical movement of the axle 13 relative to the chassis 11.

Roll movement of the axle 13 relative to the arms 13a is controlled by a second pair of hydraulic dampers 21 which are connected at their lower ends with brackets 22 provided on the axle 13 and at the upper ends with upwardly extending brackets 23 mounted on the outer ends of upper arms 13a. As will be appreciated, the dampers 21 may be again isolated with a predetermined damping characteristic or can be connected to a suspension control system so that their damping can be varied.

As is evident from above, the vertical movements of axle 13 are therefore controlled by dampers 19 and the roll of the axle 13 is separately controlled by independent dampers 21 thus allowing the vertical and roll movements of the axle to be individually and more accurately controlled.

The above arm and damper arrangement described in relation to the rear axle 13 is repeated in relation to the front axle 12 and thus in the accompanying drawings similar components to those used on the front axle have been numbered similarly to the above described rear axle components.

Figure 9:
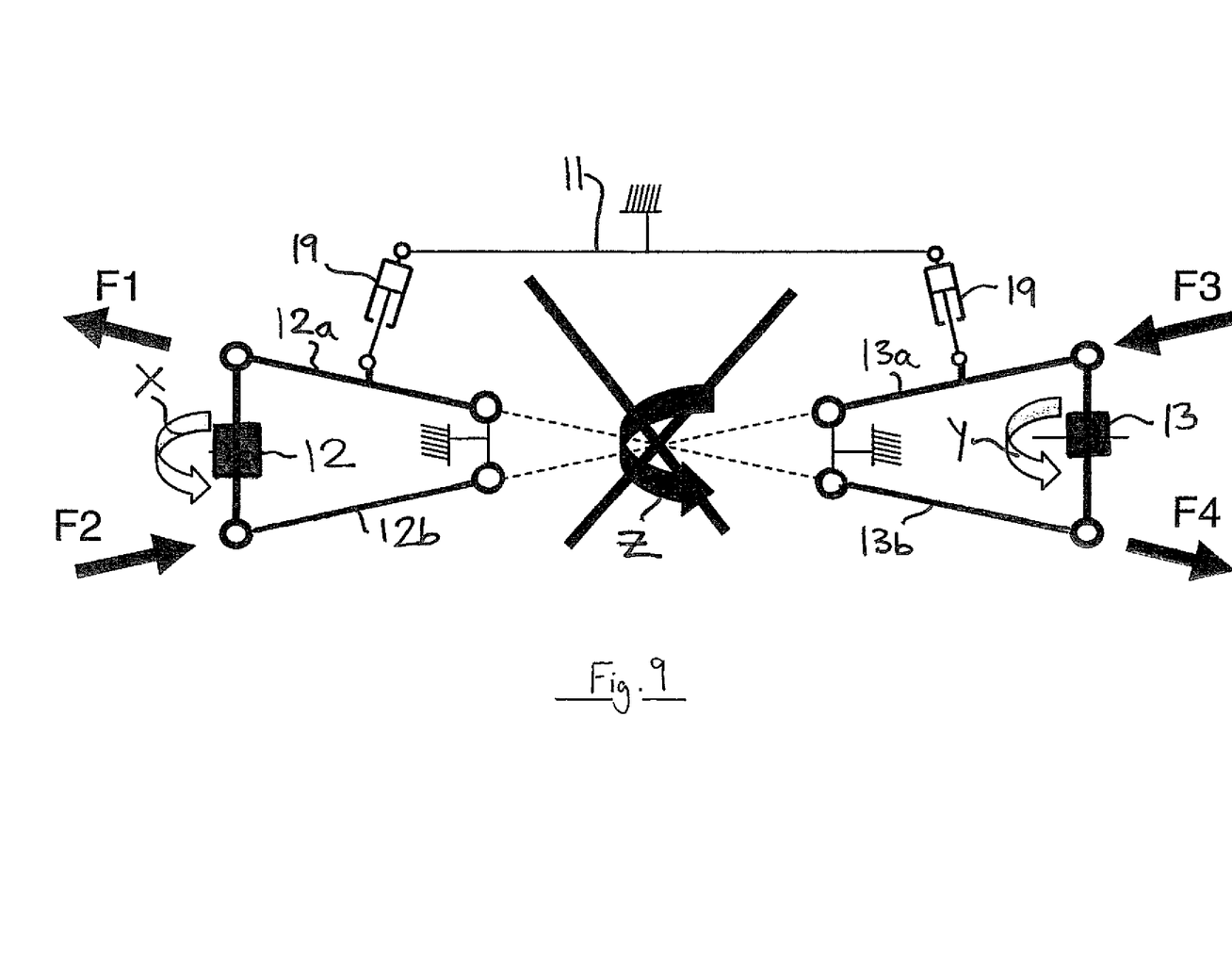
FIG. 9 shows diagrammatically the line of action of the forces applied to the chassis by the axles.

As best illustrated diagrammatically in FIG. 9, the line of action of the forces applied to the chassis 11 by the upper arms 12a,13a at one end of the chassis are substantially aligned with the line of action with the forces applied to the chassis by the lower arms 12b,13b at the other end of the chassis. This reduces the tendency of the chassis to be twisted by the forces applied thereto by the axles.

For example, the front axle 12 tends to rotate anti-clockwise relative to the chassis 11 as indicated by the arrow X in FIG. 9 when the tractor is being driven in the forward direction. This applies a tensile loading to the front upper arms 12a as indicated by the force F1 in FIG. 9 and a compressive loading to the lower front arms 12b as indicated by the force F2. In a similar manner the rear axle 13 also tends to rotate anti-clockwise relative to the chassis 11, as indicated by arrow Y in FIG. 9, so that the upper links 13a are subject to a compressive load indicated by the force F3 and the lower rear links 13b are subject to a tensile load as indicated by the force F4. Because the line of action forces F1 and F4 are aligned an opposite to each other and similarly the forces F2 and F3 are also aligned and opposite to each other any tendency for the whole chassis to be twisted in a counter clockwise sense, as indicated by the crossed-out arrow Z, is significantly reduced.

In the chassis arrangement shown in the accompanying drawings both axles 12 and 13 are provided with hydraulic steering cylinders 24 which are connected with steerable wheels hubs 12A and 13A respectively by steering rods 25. This gives a four wheel steering capability which increases the manoeuvrability of the vehicle. If desired, for example, only the front axle 12 need be provided with a steering capability.

Figure 2:
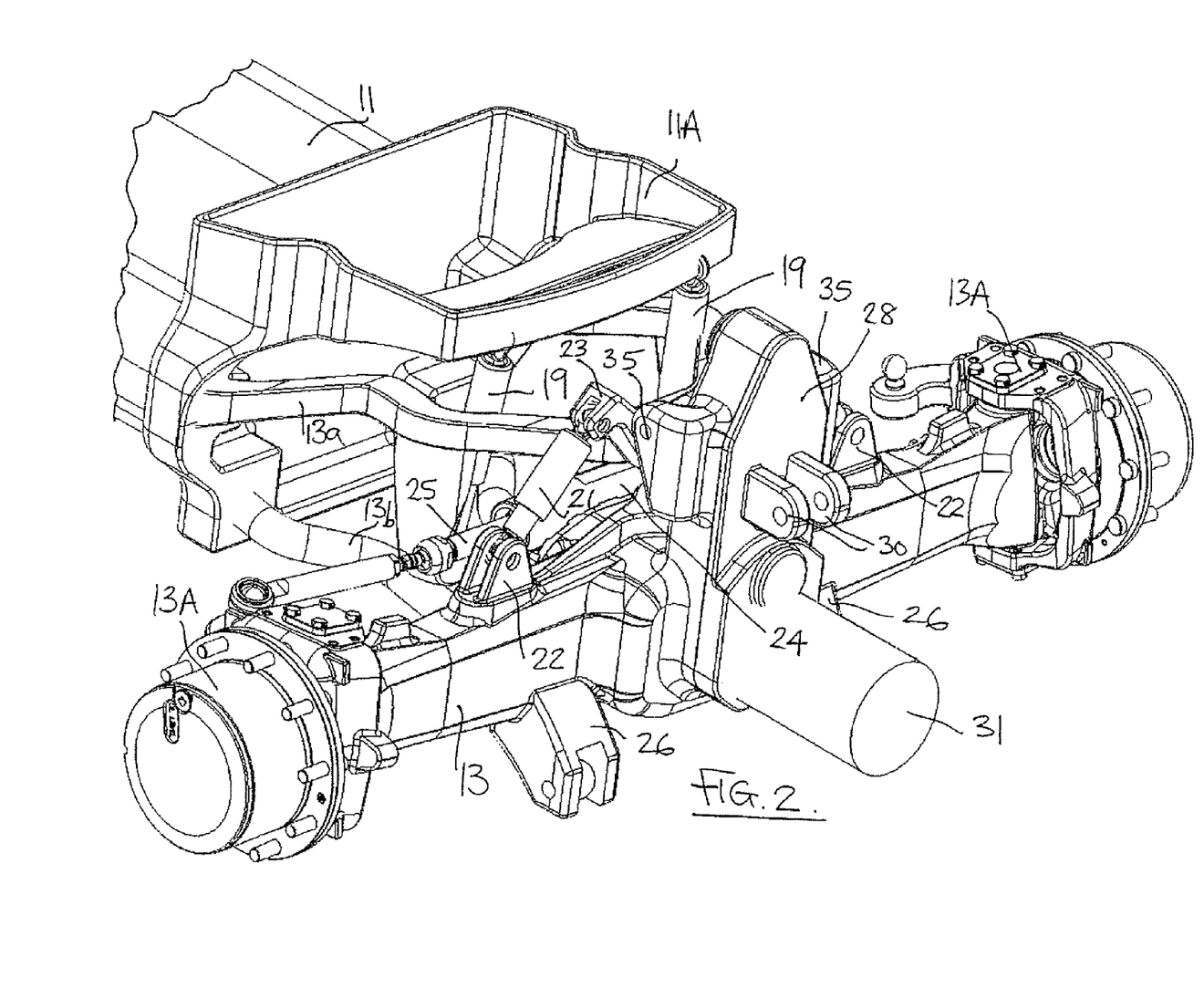
FIGS. 2, 3 and 4 show assembled perspective views of the axle mounting arrangement shown in FIG. 1.
Figure 3:
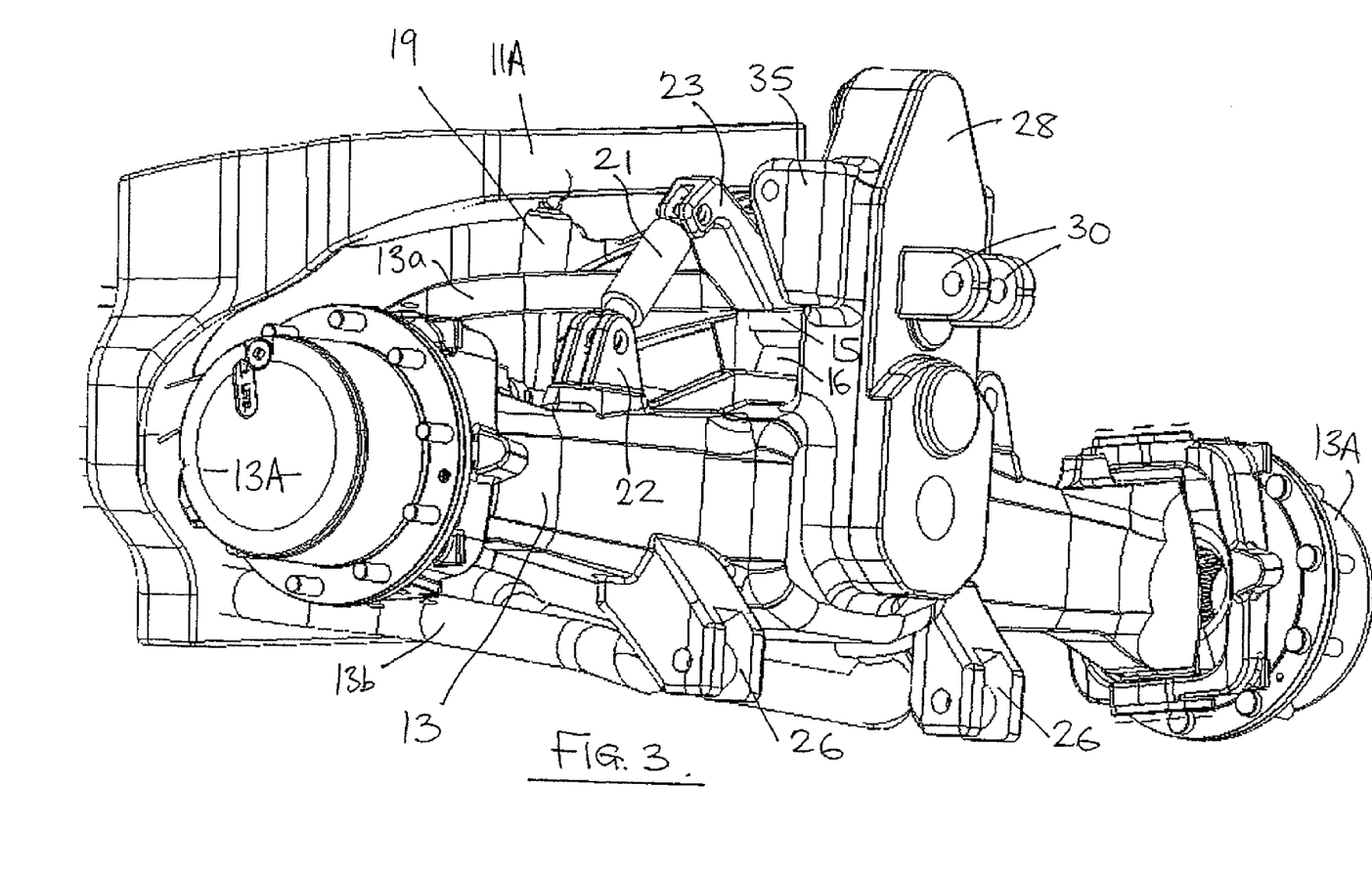
Figure 4:
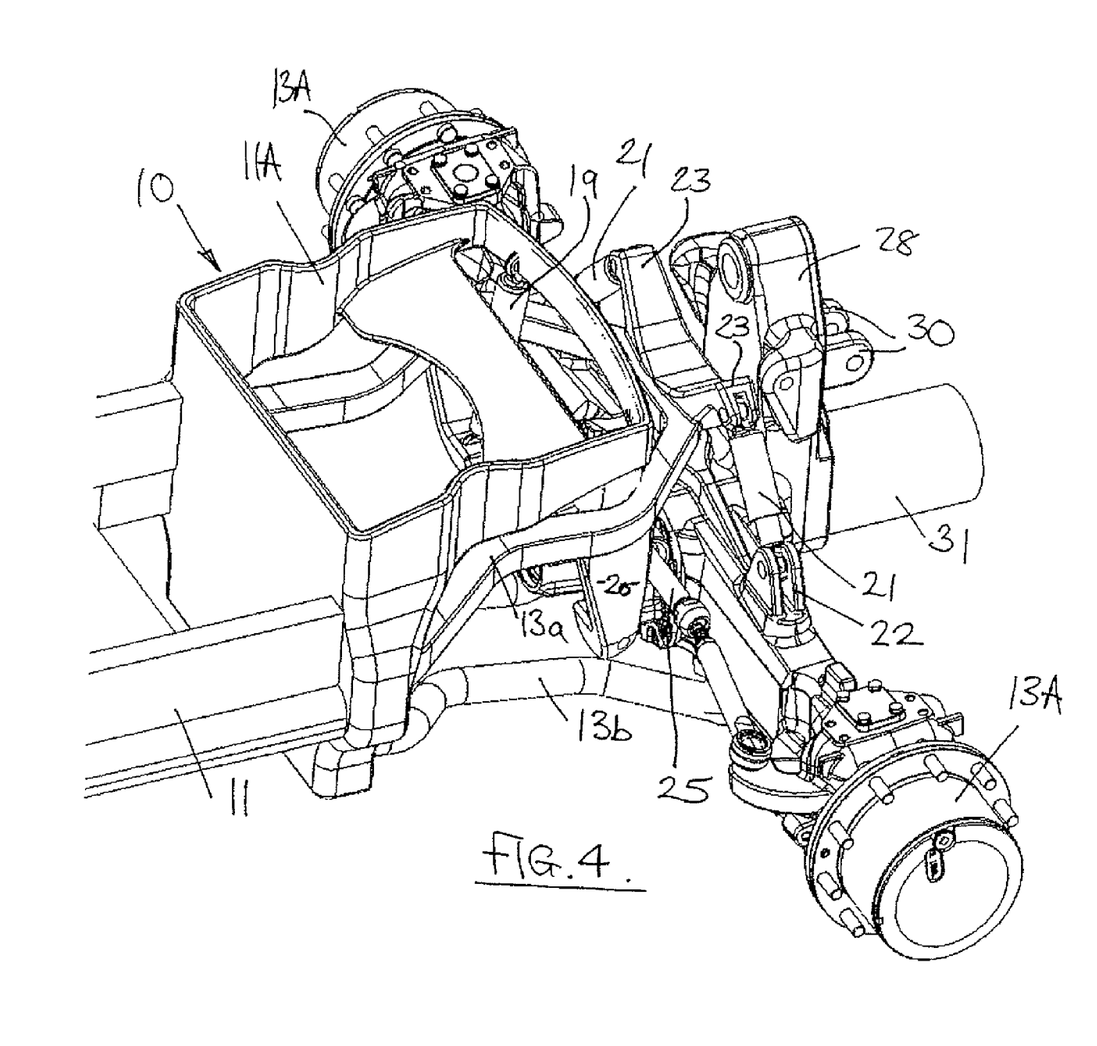
Figure 5:
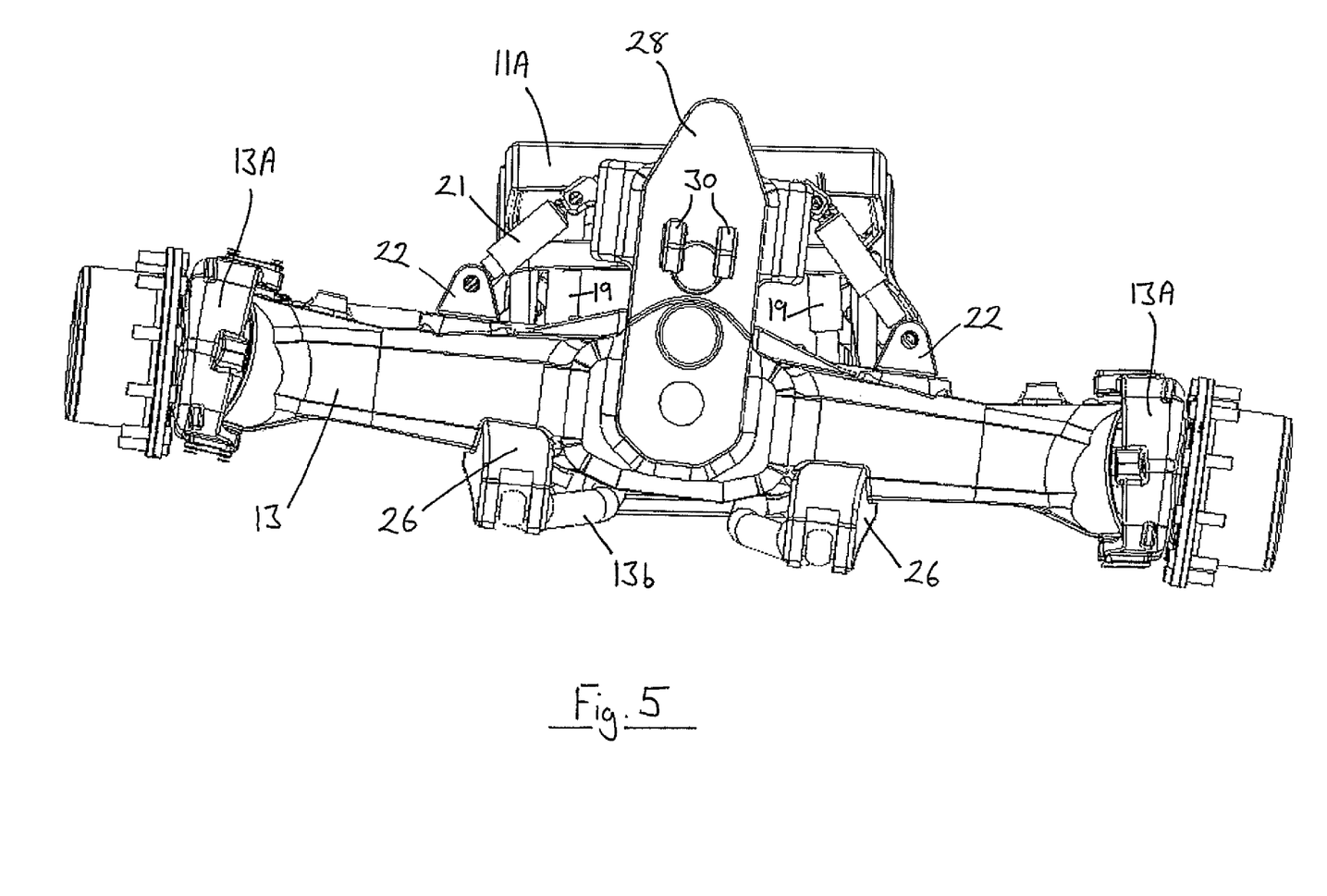
FIG. 5 shows one end view of the axle mounting arrangement of FIGS. 1 to 3.
Figure 6:
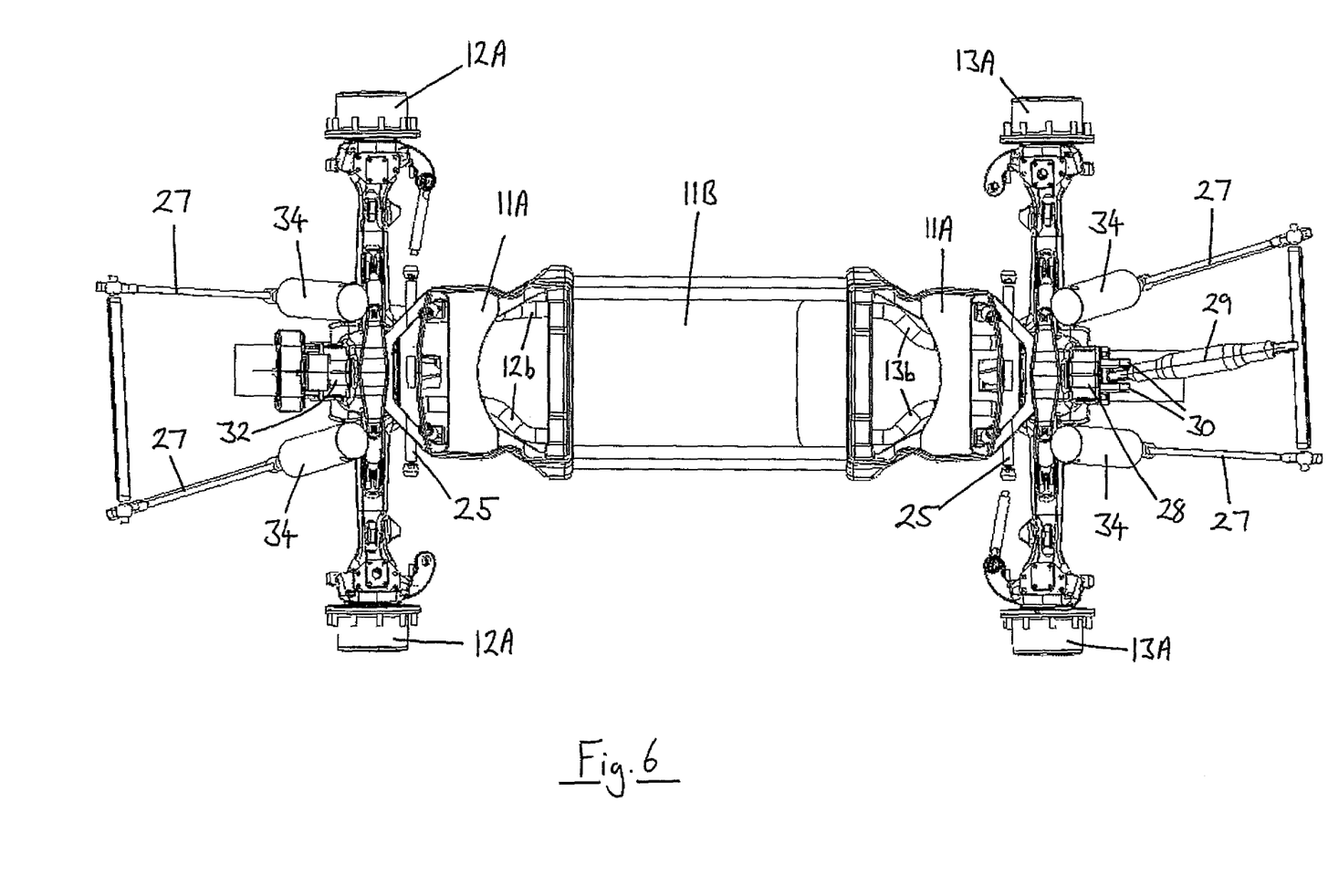
FIGS. 6 and 7 show plan and side views respectively of a vehicle provided with axle mounting arrangements in accordance with the present invention at the front and rear of the vehicle.
Figure 7:
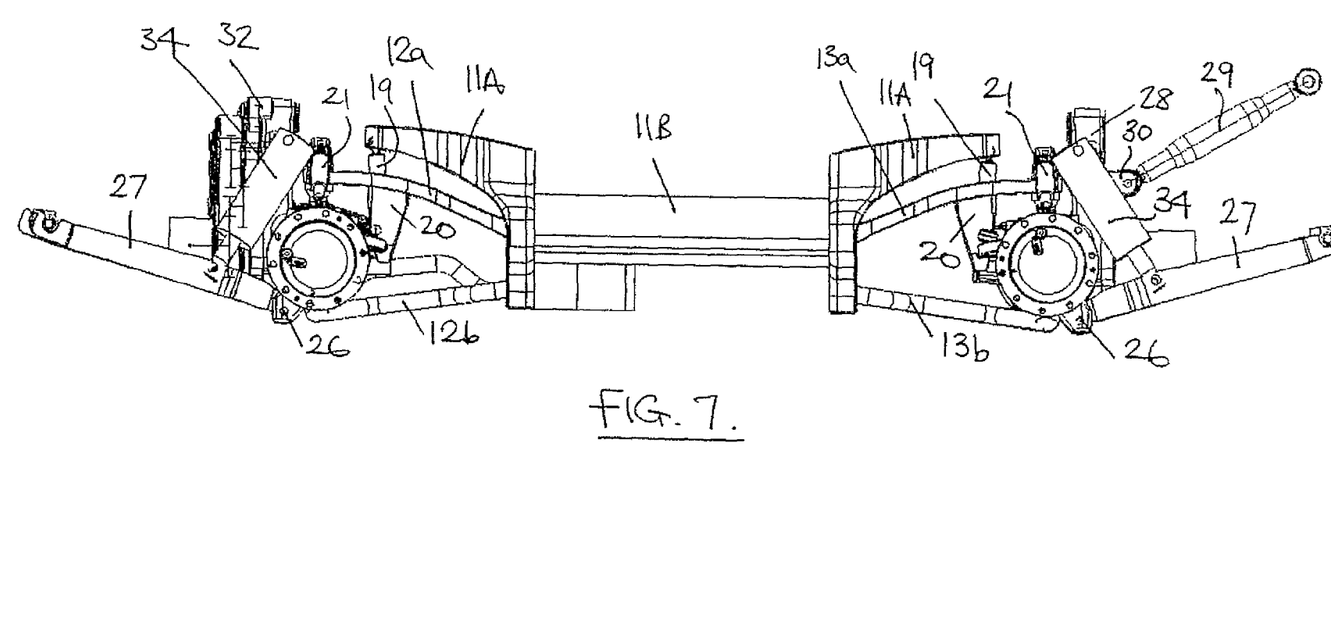
Figure 8:
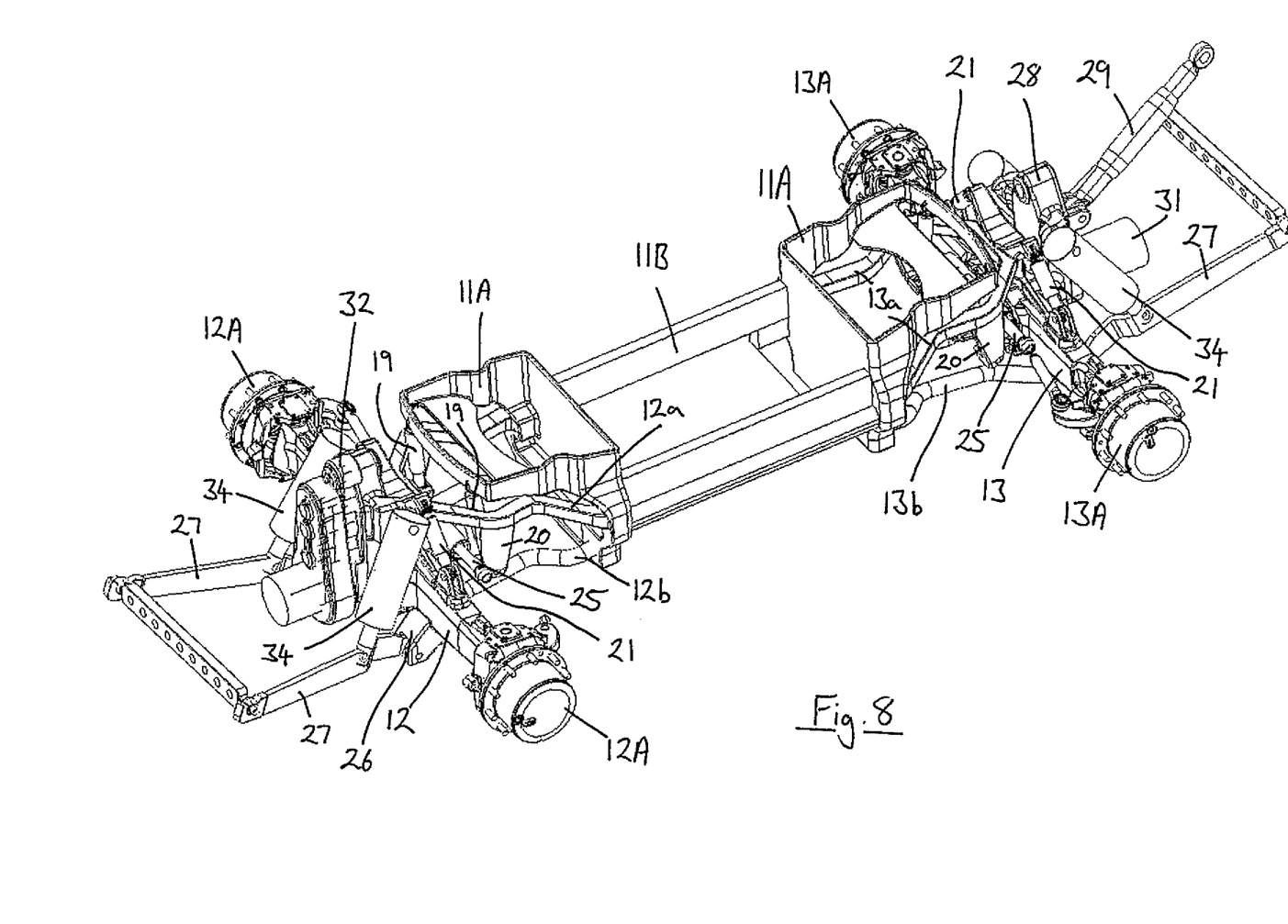
FIG. 8 shows a perspective view of the vehicle of FIGS. 6 and 7.

Both the front and rear axles 12 and 13 are provided with brackets 26 on which lower implement mounting links 27 may be pivotally mounted in the normal manner. As can be seen from FIG. 2, the rear axle 13 is provided with a vertically extending housing 28 on which an upper implement mounting link 29 may be mounted via a bracket 30. The vertically housing 28 may also include a drive train for a PTO shaft 31 which projects rearwardly from axle 13.

A similar vertically extending housing 32 may be provided on front axle 12 from which a front PTO 33 may extend and a further upper implement mounting link (not shown) may be mounted.

The front and rear implement mounting links 27 may be moved vertically relative to the chassis 11 by lift cylinders 34 which act between the links 27 and ears 35 and 36 provided on the vertically extending housings 28 and 32 respectively.

The tractor may be powered by conventional internal combustion engine which could be housed in a central lower portion 11B of the chassis with drive shafts extending forwards and rearwards to the front and rear axles respectively. Alternatively, the chassis arrangement described above is particularly suitable for the use of electric motor propulsion in which, for example, a first electric motor 40 may be provided beneath the rear upper chassis portion 11A and a front electric motor 41 may be provided below the front upper chassis portion 11A. These motors may be powered from a battery installation located in the central lower chassis portion 11B. Other well known power sources may be provided for the motors 40 and 41.

For example, a small internal combustion engine may drive a generator which charges the battery pack or a fuel cell may be used to generate electricity for powering the motors.

The invention claimed is:

1. A vehicle having a chassis and at least one axle suspended from the chassis for vertical and roll movement relative to the chassis, the axle being mounted on the chassis via a first pivotal mounting means which is pivoted on the chassis for vertical pivoting movement relative thereto and which carries an axle support on which the axle is free to pivot in the roll mode, a first damping means acting between the chassis and the first pivotal mounting means to control vertical movement of the axle relative to the chassis, and a second damping means acting between the first pivotal mounting means and the axle to provide independent control of the roll movement of the axle relative to the chassis.

2. A vehicle according to claim 1 in which the first pivotal mounting means comprises an upper pair of arms pivoted at their inner ends on the chassis and carrying the axle support at their outer ends.

3. A vehicle according to claim 2 in which a second lower pair of arms are pivoted at their inner ends on the chassis for vertical pivoting movement relative thereto and act at their outer ends on the axle to control fore and aft movement of the axle relative to the chassis.

4. A vehicle according to claim 3 in which axles are each mounted on the front and rear of the chassis by respective upper and lower pairs of arms.

5. A vehicle according to claim 4 in which the damping means comprise hydraulic or pneumatic cylinders or spring units.

6. A vehicle according to claim 4 in which the chassis has a central region and raised front and rear end regions beneath which the respective axles are mounted, the first damping means acting between a given upper pair of axle mounting arms and the adjacent raised end portion of the chassis.

7. A vehicle according to claim 6 in which each axle is provided with an electric drive motor located beneath the respective raised end portion of the chassis, a power source for each motor being housed in the central region of the chassis.

8. A vehicle according to claim 7 in which the power source comprises a fuel cell and/or batteries or an electrical generator driven by an internal combustion engine charging batteries.

9. A vehicle according to claim 4 in which the two pairs of arms are mounted on the chassis so that the line of action of the forces applied to the chassis by the upper arms at one end of the chassis are substantially aligned with the line of action of the forces applied to the chassis by the lower arms at the other end of the chassis, so that there is less tendency for the chassis to be twisted by the forces applied thereto by the axles.

10. A vehicle according to claim 9 in which the damping means comprise hydraulic or pneumatic cylinders or spring units.

11. A vehicle according to claim 3 in which the damping means comprise hydraulic or pneumatic cylinders or spring units.

12. A vehicle according to claim 2 in which the upper pair of arms have a first pair of downwardly extending brackets to which one end of the first damping means is secured and a second pair of upwardly extending brackets from which one end of the second damping means is secured.

13. A vehicle according to claim 12 in which the damping means comprise hydraulic or pneumatic cylinders or spring units.

14. A vehicle according to claim 2 in which the damping means comprise hydraulic or pneumatic cylinders or spring units.

15. A vehicle according to claim 1 in which the damping means comprise hydraulic or pneumatic cylinders or spring units.

16. A vehicle according to claim 15 in which the hydraulic or pneumatic cylinders or spring units are connected with a fluid pressure control system which provides on the go active damping of the or each axle.

17. A vehicle according to claim 1 in which one or both axles are steerable.

18. A vehicle according to claim 1 in which at least one axle has a central vertically extending housing on which an upper implement attachment link mounted point is provided, lower implement attachment link mounting points being provided on either side of the centre of the axle.

19. A vehicle according to claim 18 in which the central vertically extending housing supports a PTO drive shaft and contains a drive train for the PTO shaft.

\* \* \* \* \*